(12) United States Patent
Kotani (10) Patent No.: US 7,359,621 B2
(45) Date of Patent: Apr. 15, 2008

(54) RECORDING APPARATUS

(75) Inventor: Takuya Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1323 days.

(21) Appl. No.: 09/948,632

(22) Filed: Sep. 10, 2001

(65) Prior Publication Data

US 2002/0034144 A1   Mar. 21, 2002

(30) Foreign Application Priority Data

Sep. 13, 2000   (JP) .............................. 2000-277896

(51) Int. Cl.
*H04N 7/00*   (2006.01)
*H04N 5/76*   (2006.01)

(52) U.S. Cl. .......................................... 386/96; 386/95

(58) Field of Classification Search .................. 386/96, 386/95, 125, 104, 105, 106
See application file for complete search history.

(56) References Cited

U.S. PATENT DOCUMENTS 5,949,599 A * 9/1999 Murabayashi ................. 360/51
6,636,474 B1 * 10/2003 Tanaka et al. ............ 369/275.3

* cited by examiner

*Primary Examiner*—Thai Q. Tran
*Assistant Examiner*—Nigar Chowdhury
(74) *Attorney, Agent, or Firm*—Fitzpatrick, Cella, Harper & Scinto (57) ABSTRACT

An apparatus for recording second audio data on a recording medium on which first audio data including a plurality of first audio packets each containing audio information is recorded. One of the plurality of first audio packets is designated and the second audio data is recorded on the recording medium together with identification data for identifying the designated first audio packet.

13 Claims, 7 Drawing Sheets

RECORDING APPARATUS

BACKGROUND OF THE INVENTION

1. Field of the Invention

The present invention relates to a recording apparatus and, more particularly, to an apparatus for recording and reproducing a plurality of groups of audio data.

2. Related Background Art

Various techniques and systems for compression encoding of image data and audio data have been devised. Among such compression encoding systems, the MPEG 2 (Moving Picture Experts Group) system is presently being used in DVD (Digital Versatile Disc) video standards, etc., and is attracting attention. A transport stream of MPEG 2 (hereinafter referred to as "MPEG2-TS") is divided in its entirety, into data sequences of fixed lengths each of which is called a packet, and thus is suitable for data transmission in a transmission system using a network, and is therefore being used in digital TV broadcasting.

A plurality of streams of moving images and audio are multiplexed in one MPEG2-TS, and techniques for recording MPEG2-TSs on a magnetic tape, a hard disk, a magneto-optical disk, etc., have recently been proposed.

It is conceivable that audio data can be recorded by being added by after-recording to an MEPG2-TS recorded on a recording medium.

In MPEG2-TS, however, it is extremely difficult to synchronize the audio data recorded by after-recording with originally recorded audio data, because moving image data and audio data are multiplexed while being divided into packets as mentioned above.

SUMMARY OF THE INVENTION

In view of the above-described problem, an object of the present invention is to provide a recording apparatus which records audio information or any other kind of information on a recording medium by adding this information to image and audio information already recorded on the recording medium, and which can easily reproduce the newly recorded information in synchronization with the originally recorded information.

To achieve this object, according to the present invention, there is provided an apparatus for recording second audio data on a recording medium on which first audio data including a plurality of first audio packets each containing audio information is recorded, the apparatus comprising recording means, and control means for designating one of the plurality of first audio packets and for controlling the recording means so that the recording means records the second audio data on the recording medium together with identification data for identifying the designated first audio packet.

These and other objects and features of the present invention will become apparent from the following detailed description of the embodiment of the invention with reference to the accompanying drawings.

DESCRIPTION OF THE PREFERRED EMBODIMENTS

An embodiment of the present invention will be described with reference to the accompanying drawings.

Figure 1:
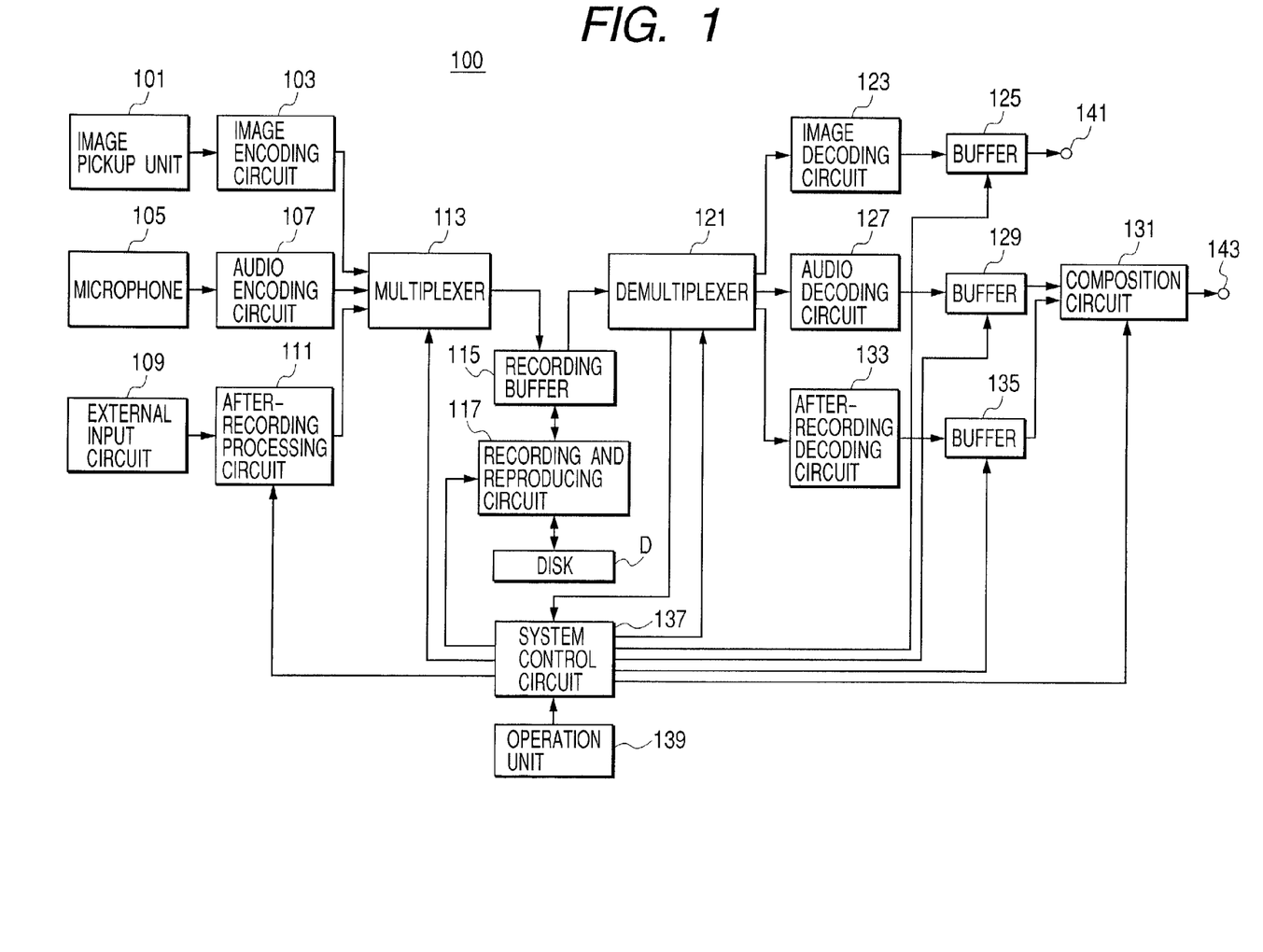
FIG. 1 is a block diagram showing the configuration of a recording and reproducing apparatus to which the present invention is applied.

FIG. 1 is a block diagram showing the configuration of a recording and reproducing apparatus 100 to which the present invention is applied. The recording and reproducing apparatus of this embodiment encodes, in the MPEG2-TS format, motion image information obtained by image pickup operation and audio information simultaneously obtained during image pickup operation, and records and reproduces the encoded information on and from a magneto-optical disk. The ordinary image pickup and recording operations of the recording and reproducing apparatus will first be described.

An image pickup unit 101 obtains motion image data and outputs this data to an image encoding circuit 103. The image encoding circuit 103 encodes the motion image data output from the image pickup unit 101 in accordance with the MEPG2-TS format, and outputs the encoded data to a multiplexer 113. A microphone 105 outputs audio data to an audio encoding circuit 107. The audio encoding circuit 107 encodes audio data in accordance with the MEPG2-TS format and outputs the encoded data to the multiplexer 113.

The multiplexer 113 has a buffer memory for buffering encoded motion image data output from the image encoding circuit 103 and encoded audio data output from the audio encoding circuit 107, and stores the encoded motion image data and audio data in the memory. The multiplexer 113 adds a predetermined header to each of the encoded image data and the audio data of a predetermined time period, divides by a predetermined amount each group of the encoded image data and the encoded audio data corresponding to the predetermined time period into a plurality of subgroups, and adds a header determined in accordance with the MPEG2-TS format to each divided subgroup of data, thereby forming a plurality of packets (transport stream packets, hereinafter referred to as TS packets) each of an amount of 188 bytes.

Further, in this embodiment, the multiplexer 113 generates, in accordance with instructions from a system control circuit 137, packet number data of different values corresponding respectively to different motion image and audio TS packets and arranges the packet number data corresponding to each TS packet at a predetermined position in each TS packet. The multiplexer 113 then multiplexes the motion image data TS packets and the audio data TS packets at a timing based on instructions from the system control circuit 137, further generates program specification information (PSI) such as a Program Association Table (PAT) and a Program Map Table (PMT) determined in accordance with the MPEG2-TS, multiplexes the PSI at a predetermined timing, and outputs the multiplexed packets to a recording buffer 115.

Encoding and multiplexing of motion image data and audio data in this embodiment will be described with reference to FIG. 2.

In this embodiment, encoded motion image data of the predetermined time period corresponding to a video frame is called a video packetized elementary stream (video PES), and a header is added to each video PES. Also, encoded audio data of the predetermined time period or a predetermined samples, corresponding to an audio frame, is called an audio PES, and a header is added to each audio PES. Referring to FIG. 2, each of video PES 210 and audio PES 203 is divided into a plurality of portions each of a predetermined amount; a header prescribed with respect to MPEG2-TS is added to each divided portion to form a TS packet; and video TS packets and audio PS packets thus formed are multiplexed to form MPEG2-TS 205. In this embodiment, when one audio PES is an encoded audio signal of a predetermined period, each PES has different amount of data. In case of that one audio PES is an encoded audio signal of a predetermined samples, the lengths of audio signal before being encoded, corresponding respectively to PESs, are different from each other.

Figure 2:
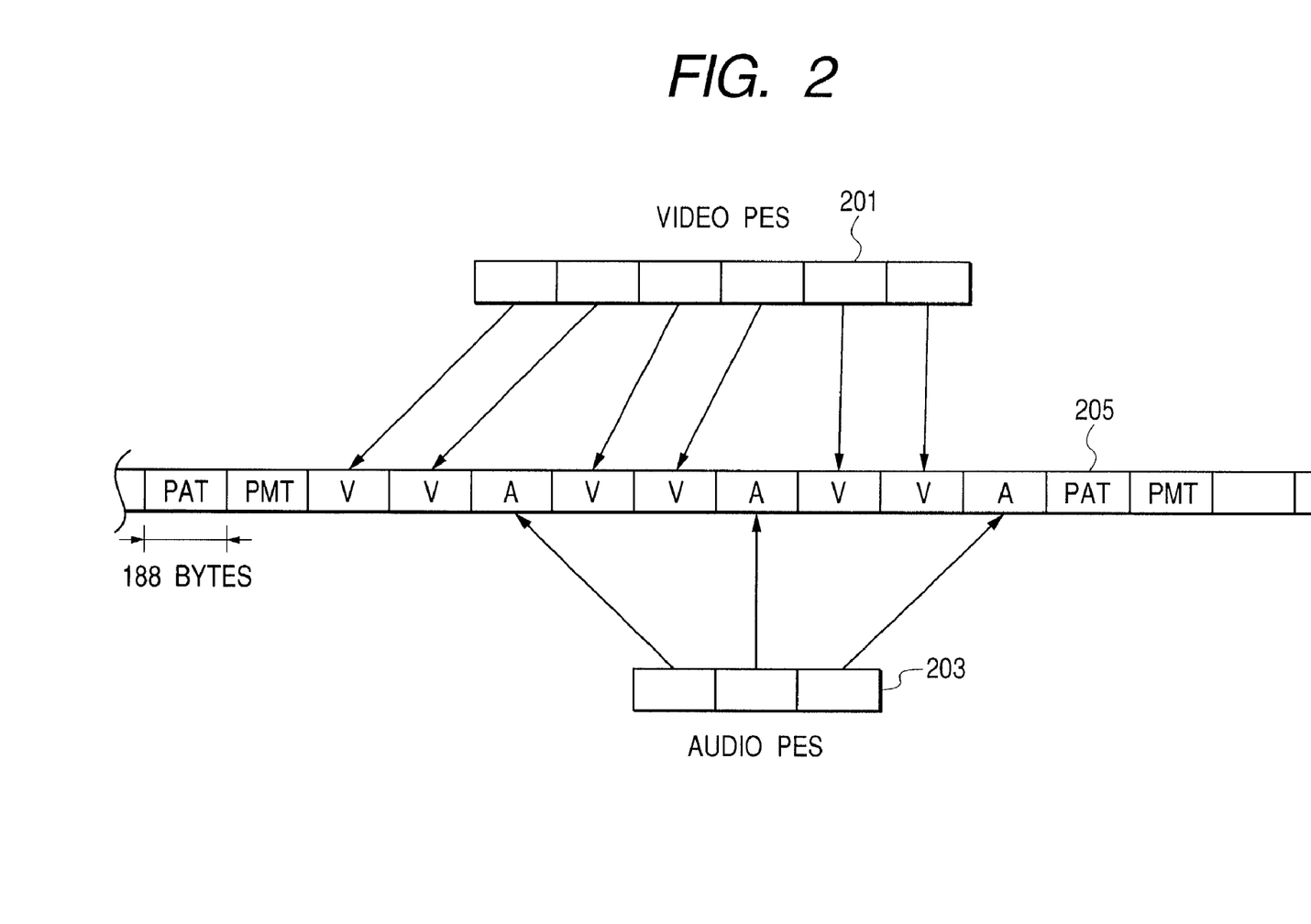
FIG. 2 is a diagram showing the configuration of MPEG2-TS.

TS packets indicated by V in FIG. 2 are video data packets, and TS packets indicated by A in FIG. 2 are audio packets. In this embodiment, each time corresponding video PESs and audio PESs are multiplexed in the MPEG2-TS format, PAT and PMT packets are multiplexed.

In FIG. 2, one video PES packet and one audio PES packet are illustrated as if they correspond to each other one-to-one. However, such a one-to-one corresponding is not always necessary.

Each of all the TS packets is constituted by 188-byte data, as mentioned above. Also, packet number data is separately added to the video PS packets and the audio PS packets. Different packet numbers are respectively assigned to the packets. That is, predetermine values, e.g., numbers incremented by 1 one after another are assigned to the packets respectively. If the amount of data in one TS packet is smaller than 188 bytes, staffing data is recorded in the area corresponding to the lack of the amount of data.

MPEG2-TS data multiplexed and stored in the recording buffer 115 as described above is read out to a recording and reproducing circuit 117 at a predetermined timing. The recording and reproducing circuit 117 includes well-known recording and reproducing means, e.g., a light beam pickup and a magnetic head and records on a disk D the data read out from the recording buffer 115. In this embodiment, the rate at which data is recorded on the disk D is several times the data rate of MPEG2-TS output to the recording buffer 115. When a predetermined amount of data is stored in the recording buffer 115, the recording and reproducing circuit 117 reads out the data and records the data on the disk D. The disk D is accommodated in a cartridge (not shown) and can be easily loaded into and unloaded from the recording and reproducing apparatus 100.

At the time of reproducing, the recording and reproducing circuit 117 reproduces the data recorded on the disk and outputs the reproduced data to the recording buffer 115. The reproduced data recorded in the recording buffer 115 is read out at a predetermined timing to be output to a demultiplexer 121.

The demultiplexer 121 detects packet IDs (PIDs) of the video TS packets and audio TS packets on the basis of PATs and PMTs in the reproduced MPEG2-TS, and separates the video TS packets and audio TS packets from the reproduced data train. The demultiplexer 121 has an internal buffer memory and thereby buffers several packets of each of the separated video and audio TS packets to form the original video PESs and audio PESs. The demultiplexer 121 outputs the video PESs and audio PESs to an image decoding circuit 123 and an audio decoding circuit 127 respectively at a timing based on instructions from the system control circuit 137.

The image decoding circuit 123 decodes the encoded motion image data output from the demultiplexer 121 and outputs the decoded data to a buffer memory 125. The audio decoding circuit 127 decodes the encoded audio data output from the demultiplexer 121 and outputs the decoded data to a buffer memory 129.

The motion image data stored in the buffer memory 125 is read out at a timing based on instructions from the system control circuit 137 to be output to an external monitor through a terminal 141. The audio data stored in the buffer memory 129 is read out at a timing based on instructions from the system control circuit 137 to be output to a composition circuit 131.

Timings of decoding and outputting of the reproduced motion image data and audio data will be described.

In the MPEG2-TS, data called Program Clock Reference (PCR) is used to set the reference time of the decoding side to the value intended by the encoding side. Also, to synchronize the timing of outputting of the reproduced motion image information and audio information with the timing of encoding, data called Program Time Stamp (PTS) indicating a time at which the reproduced motion image information and audio data are to be output is used. This PTS is included in the PES header of the video PESs and audio PESs. On the decoding side, each time the PTS is detected, the corresponding output timing is determined. That is, on the decoding side, with respect to each one video frame and one audio frame, synchronization of the output timing of the frame is performed.

The PTS represents the count of the clock set by the above-mentioned PCR. At the timing when the value of PTS becomes equal to the count, the video and audio data including this PTS is output. In this manner, the motion image information and audio information can be reproduced with being synchronized with each other.

The demultiplexer 121 detects PCR and PTS from the reproduced MPEG2-TS data and outputs the detected PCR and PTS to the system control circuit 137. The system control circuit 137 sets the clock timing of its internal clock generator according to the PCR. The system control circuit 137 also controls the timing of outputting the reproduced motion image data and audio data from the buffer memories 125 and 129 on the basis of the PTS and the count value of the counter counting this clock.

The audio data output from the buffer memory 129 is supplied to the composition circuit 131. The composition circuit 131 switches between the reproduced audio data from the buffer memory 129 and after-recording audio data described later in accordance with a control signal from the system control circuit 137 to be output to the external monitor through an output terminal 143.

After-recording processing in this embodiment will now be described.

Figure 3:
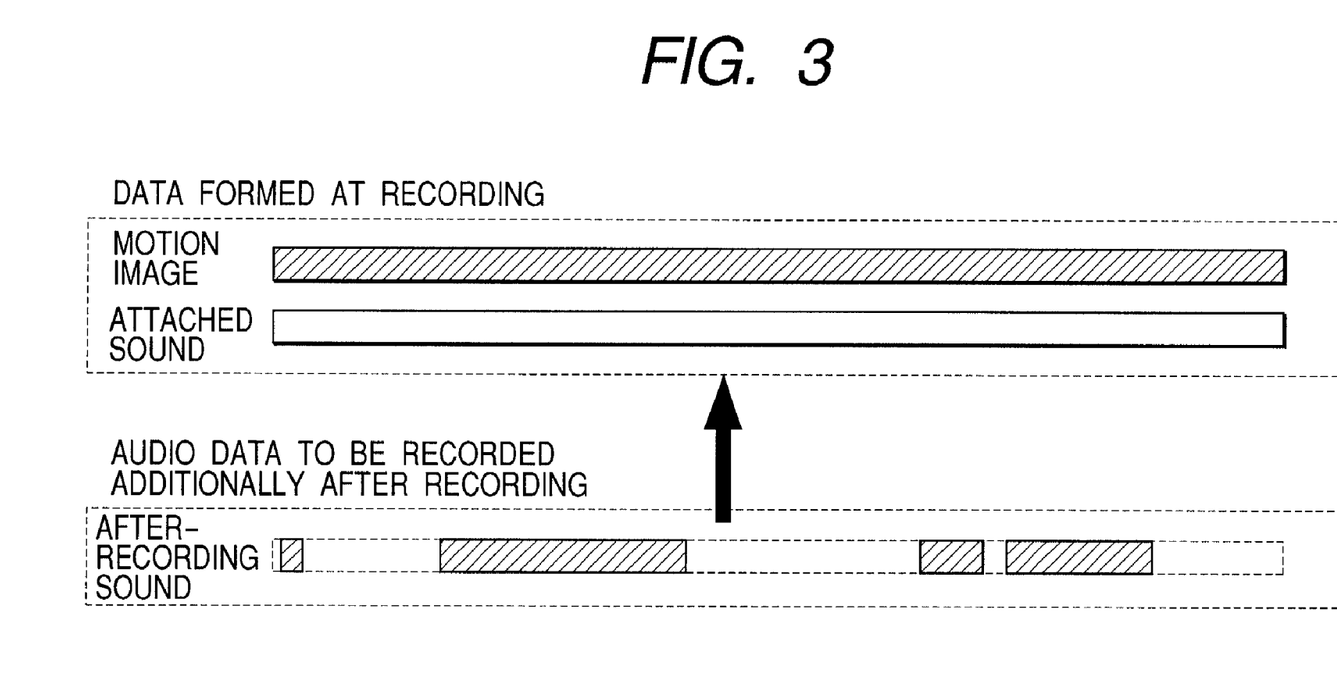
FIG. 3 is a diagram showing after-recording audio data.

FIG. 3 is a diagram showing a state where after-recording sound is recorded by being added to motion image data and audio data recorded in advance on the disk D in the above-described manner. In the description of this embodiment, audio data recorded during ordinary motion image pickup will be referred to as attached audio data, and audio data additionally recorded by after-recording will be referred to as after-recording audio data.

As mentioned above, the encoding method of audio data is also prescribed with respect to the MPEG2-TS. In this embodiment, however, it is assumed that after-recording sound is encoded in the Advanced Audio Coding format (AAC) used in digital broadcasting using the Broadcasting Satellite. For example, in this embodiment, after-recording sound is incorporated as Private Stream 1.

Referring to FIG. 1, when after-recording is performed, a user operates an operation unit 139 to input an instruction to initiate ordinary reproduction. When the instruction to initiate ordinary reproduction is given, the system control circuit 137 starts reproduction of data recorded on the disk D as described above by controlling the components of the apparatus. Motion image data thereby reproduced is output from the buffer memory 125 to the image monitor (not shown) through the terminal 141, and the user checks the reproduced motion images. Also, reproduced audio data is output from the composition circuit 131 to a speaker or a TV monitor (not shown) through the terminal 143 to enable the user to check the reproduced audio data. Timing of outputting the motion image information and audio information to be reproduced is controlled as described above.

If in this state the user inputs an instruction to start after-recording, the system controller 137 forms after-recording audio stream data by controlling an after-recording processing circuit 111 and the multiplexer 113. After-recording audio stream forming and recording processing will be described below with reference to FIG. 4.

Figure 4:
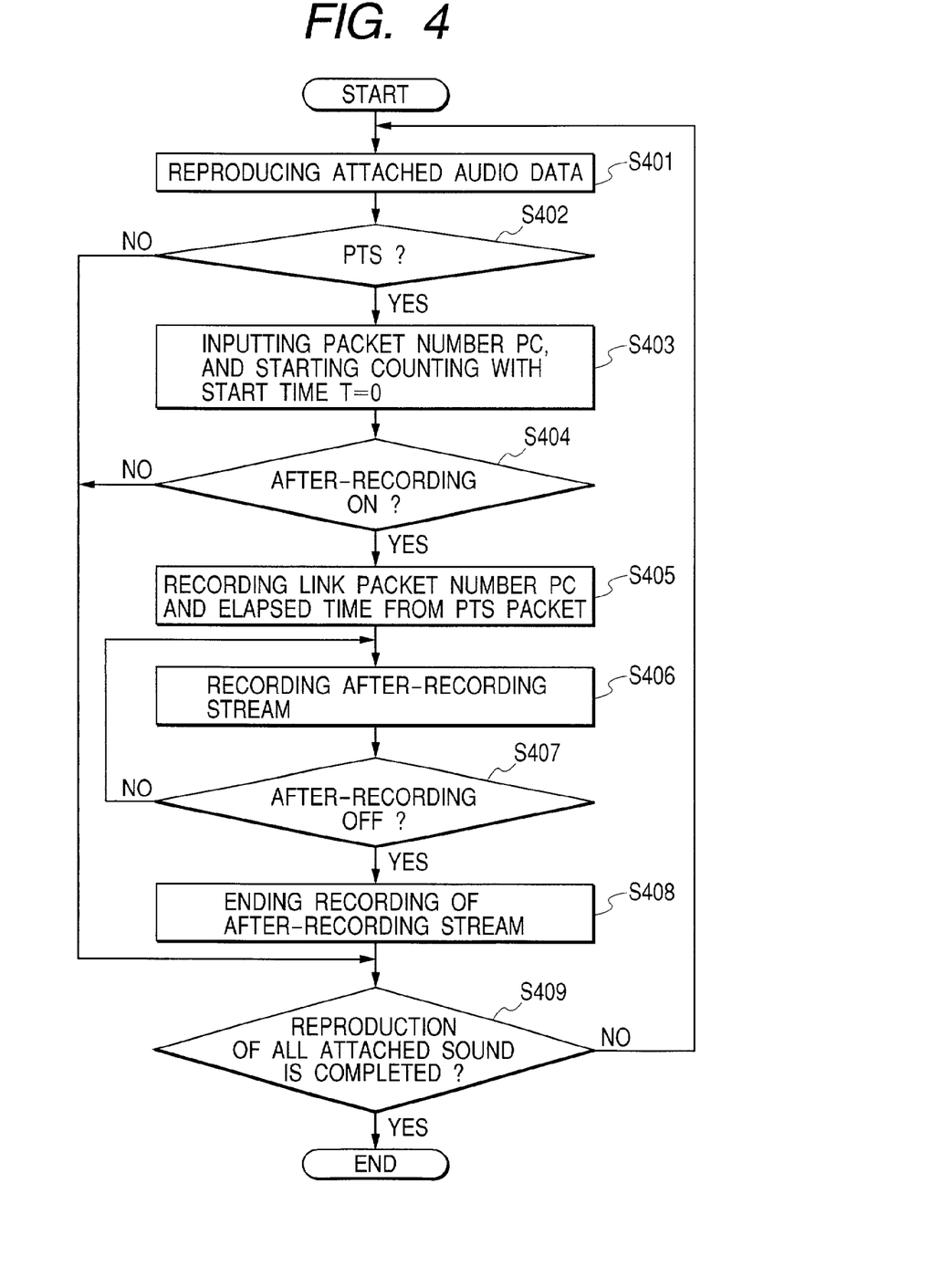
FIG. 4 is a flowchart for explaining processing for recording of after-recording audio data.

FIG. 4 is a flowchart for explaining the operation of the system control circuit 137 when after-recording processing is performed.

Referring to FIG. 4, when an instruction to start reproduction is given, image data and attached audio data recorded on the disk D are reproduced (step S401). A TS packet containing PTS is detected from the reproduced attached audio data (step S402), the packet number PC of the TS packet is supplied from the demultiplexer 121 to be set as a variable PC', and count T of the internal elapsed-time counter is reset to 0, thereby starting counting (step S403). Steps S402 and S403 are executed each time a TS packet containing PTS is detected from the reproduced attached audio data.

The external input circuit 109 is supplied with audio data in the above-mentioned AAC format and outputs the audio data to the after-recording processing circuit 111.

If in this condition, an after-recording ON instruction is supplied from the operation unit 139, the variable PC' at the time of instruction is recorded as a link packet number and the after-recording processing circuit 111 is controlled to record the lapse of time T from the start of reproduction of packets containing PTS.

The after-recording processing circuit 111 forms an after-recording audio stream such that the link packet number PC' output from the system control circuit 137 and the lapse time T are recorded in the top packet in the after-recording stream, and outputs the stream to the multiplexer 113. The multiplexer 113 operates in accordance with instructions from the system control circuit 137 to form an after-recording sound MPEG2-TS by adding TS packet headers, etc., to the after-recording audio stream output from the after-recording processing circuit 111, and by multiplexing data including PAT and PMT. The multiplexer 113 outputs the after-recording sound MPEG2-TS to the recording buffer 115.

Figure 5:
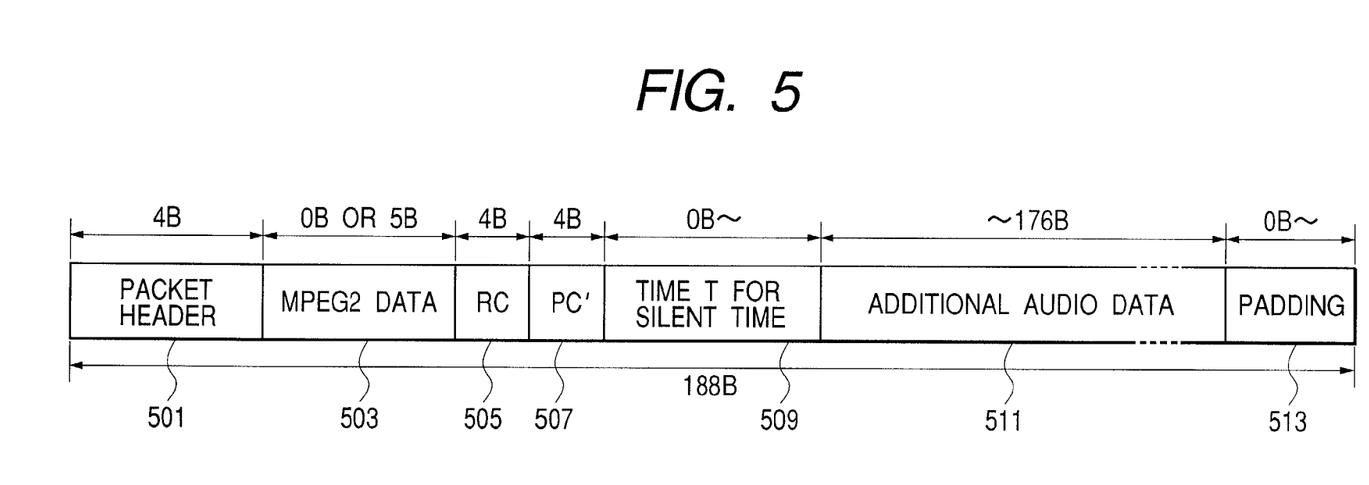
FIG. 5 is a diagram of TS packets of after-recording data.

FIG. 5 is a diagram showing the contents of each TS packet for after-recording sound.

One TS packet for after-recording sound also consists of 188-byte data.

As shown in FIG. 5, each TS packet has a 5-byte TS packet header 501. As PID contained in the header of the after-recording audio TS packet, a value different from those for the motion image and audio stream already recorded on the disk D is assigned.

MPEG2 data 503 is attached only to the TS packet containing data of the top portion of the after-recording audio stream. MPEG2 data 503 is constituted by a 4-byte start code indicating beginning of after-recording audio data, and 1 byte indicating the data length, i.e., a total of 5 bytes. TS packets other than the TS packet including the top portion of the after-recording audio stream has no MPEG2 data 503.

Data 505 is TS packet number data RC of the 4-byte after-recording audio data. The value RC is separately set with respect to each TS packet. Each TS packet has the value RC incremented by a predetermined value relative to that of the preceding one. Four-byte link packet number data PC' 507 designates the packet number of the newest audio TS packet having PTS at a time when the instruction to start recording of the after-recording audio data is given.

Data 509 designates the lapse of time T from a time at which reproduction of the packets of audio data containing the immediately preceding PTS was started to a time when the after-recording start instruction is given. For example, if the after-recording start instruction is given after 5.5 seconds from reproduction of the audio packet data containing the immediately preceding PTS, data indicating the duration of the silent state for 5.5 seconds is recorded.

In the description of this embodiment, for ease of understanding, it is assumed that PTS is inserted at comparatively long time intervals of, for example, 10 seconds. In actuality, however, PTS is ordinarily inserted at shorter time intervals of, for example, 0.5 to 1 second, to achieve synchronization. Also in such a case, the after-recording sound reproduction timing can be accurately controlled by recording the silent time from the start of reproduction of the audio TS packet containing the immediately preceding PTS.

By using these two kinds of data, i.e., link packet number data PC' 507 and elapsed time T 509, switching for the after-recording audio data output timing in reproduction of the after-recording audio stream can be attained in synchronization with the attached audio data according to the timing designated in recording. Link packet number data PC' 507 is also recorded only in the TS packet containing the top portion of the after-recording audio stream and is not contained in the other TS packets.

The operation with respect to elapsed time T will be described with reference to FIG. 6.

Figure 6:
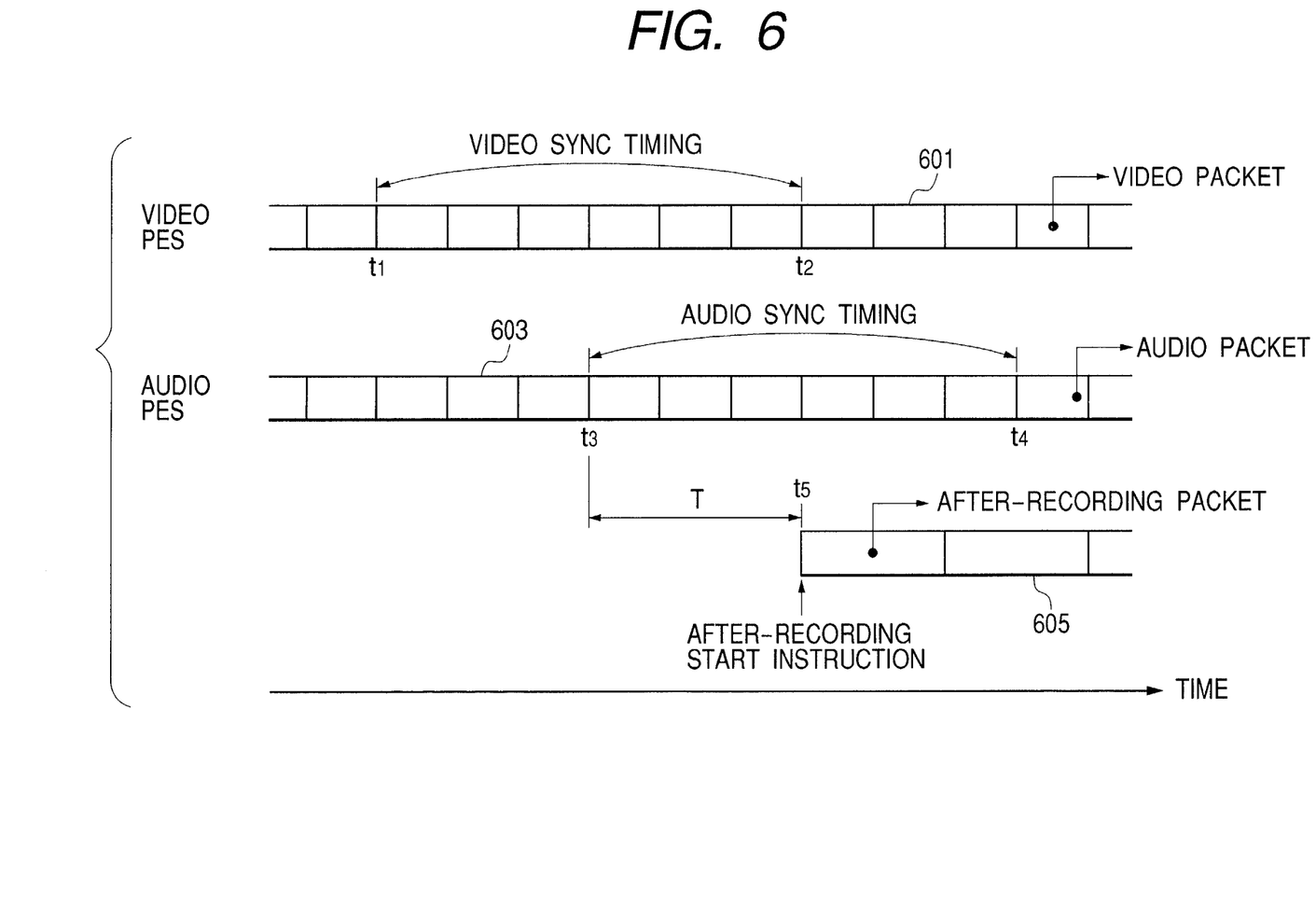
FIG. 6 is a diagram for explaining the timing of outputting after-recording audio data.

In FIG. 6, the reproduced video PES is indicated by a reference numeral 601, the reproduced audio PES is indicated by 603, and the state of the after-recording audio stream to be recorded is indicated by 605. At timings t1 and t2, the video PES is synchronized by using video PTS. At timings t3 and t4, the audio PES is synchronized by using audio PTS.

When the after-recording start instruction is given at a time t5 as shown in FIG. 6, the elapsed time T from a synchronization timing of the immediately preceding audio PES to the time at which the after-recording instruction is given, i.e., from time t3 to time t5, is recorded in the after-recording audio TS packet.

Referring to FIG. 5, after-recording audio data 511 has a length of 176 bytes at the maximum, and a reference numeral 513 denotes padding data. In the example shown in FIG. 5, the after-recording audio data does not fully occupy the field of one TS packet (188 bytes) and the remaining portion of the field is padded with 00 or FF in hexadecimal.

The after-recording audio TS data formed as shown in FIG. 5 is buffered by the recording buffer 115. The recording and reproducing circuit 117 reads out the after-recording audio TS data stored in the recording buffer 115 at a predetermined timing and records the data in an after-recording audio data recording area on the disk D.

Figure 7:
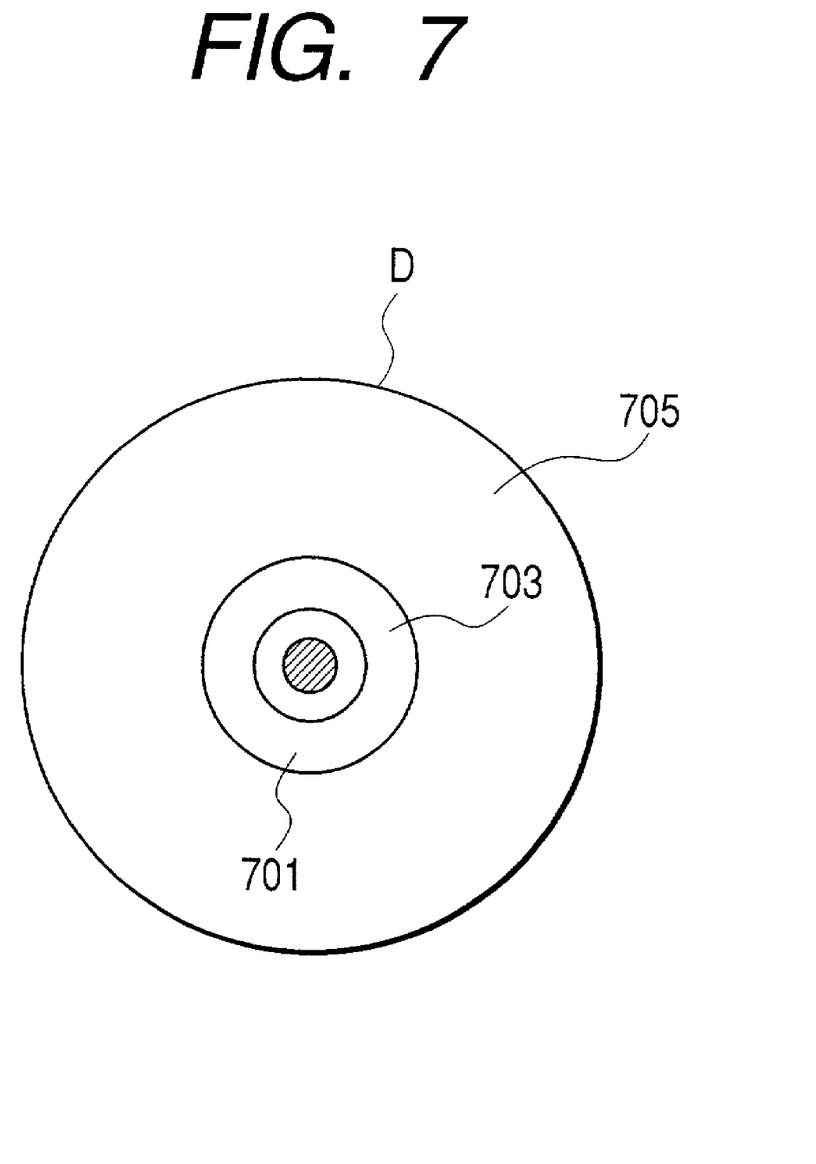
FIG. 7 is a diagram showing recording areas on a disk.

FIG. 7 is a diagram showing recording areas on the disk D.

An area indicated by a reference numeral 701 in FIG. 7 is an innermost area of the disk D where disk management data called TOC is recorded. An area 705 is an area for recording of ordinary motion image and audio data in the MPEG2-TS format. An area 703 existing between the area 701 and 705 in diameter direction of the disk D is an area for recording of after-recording audio data. The recording and reproducing circuit 117 records after-recording data in area 703 of the disk D while reproducing the motion image and audio data already recorded in area 705. As mentioned above, in this embodiment, the recording data rate of the recording and reproducing circuit 117 is several times the data rate of MPEG2-TS data stored in the recording buffer 115. During recording/reproduction, the recording and reproducing circuit 117 intermittently accesses the disk D.

Therefore after-recording audio data can easily be recorded in area 703 at a predetermined timing in the period during which reproduction from the disk D is stopped.

Also in reproduction, the after-recording sound recording area can easily be accessed because it is set as a fixed area in advance.

Recording and producing in accordance with the present invention may also be realized in such a manner that a plurality of pickup units are provided and, when one of the pickup units is used for reproduction, the other is used for recording.

The operation in reproduction of recorded data including after-recording data from the disk D will next be described. When the user operates the operation unit 139 to input an after-recording reproduction mode instruction, the system control circuit 137 controls the recording and reproducing circuit 117 to check whether any after-recording audio data is recorded in area 703 of the disk D based on TOC data. If it is thereby determined that after-recording audio data is recorded, the first TS packet of the after-recording audio stream is reproduced and is output to the demultiplexer 121 through the recording buffer 115.

The demultiplexer 121 detects link packet number PC' 507 from the reproduced after-recording audio TS packet and outputs the detected data to the system control circuit 137. In a case where a plurality of after-recording audio streams exist in the after-recording audio data recording area 703, the recording and reproducing circuit 117 reproduces all the top TS packets of the streams, detects link packet number PC' in each reproduced TS packet and outputs the detected data to the system control circuit 137.

When the link packet number PC' of the after-recording stream is stored as described above, the system control circuit 137 starts reproduction of streams of motion image data and attached audio data from area 705 of the disk D as described above. The reproduced motion image and attached audio streams are supplied to the demultiplexer 121 through the recording buffer 115. The demultiplexer 121 separates the reproduced data into motion image data and attached audio data, as in the case of ordinary reproduction, and outputs those two data to the image decoding circuit 123 and the audio decoding circuit 127, respectively.

When the after-recording reproduction mode instruction is given through the operation section 139, the system control circuit 137 controls the demultiplexer 121 to detect the packet number data contained in each TS packet of the reproduced audio data.

The system control circuit 137 monitors this packet number data in the reproduced audio data and compares it with the link packet number PC' of the after-recording audio data stored in advance. When the difference between the packet number of the audio data currently reproduced and the link packet number becomes smaller than a predetermined value, the system control circuit 137 controls the recording and reproducing circuit 117 to reproduce the after-recording audio stream from after-recording audio recording area 703 of the disk D for a predetermined time period and to output the reproduced data to the demultiplexer 121 through the recording buffer 115. The after-recording audio data is reproduced in the time period during which reading of motion image data and attached audio data from recording area 705 is stopped.

The after-recording decoding circuit 133 decodes the reproduced after-recording audio data and outputs the decoded data to the buffer 135.

The demultiplexer 121 detects the after-recording audio data on the basis of PID of the TS packets in the reproduced after-recording audio data, and outputs the detected data to the after-recording decoding circuit 133. Also, the demultiplexer 121 detects elapsed time T 509 from the top TS packet in the reproduced after-recording audio stream, and outputs the detected time to the system control circuit 137.

When the attached audio data in the TS packet corresponding to the link packet number PC' in the after-recording data is reproduced, the system control circuit 137 measures the elapsed time from the time at which reading of the attached audio data corresponding to the packet was started. When the lapse of time becomes equal to the elapsed time T 509, the system control circuit 137 starts reading of the after-recording audio data from the buffer 135 and also controls the composition circuit 131 to change the output audio data from the attached audio data to the after-recording audio data.

Thereafter, the after-recording audio data is selected and output until the after-recording audio stream recorded in area 703 ends. In this embodiment, the after-recording audio stream is Private Stream 1 in MPEG 2 and has no PTS in data. Therefore synchronization timing of the after-recording audio data is performed only at the start of reproduction of after-recording audio data.

When the above-described reproduction of the after-recording stream recorded on the disk D is completed, the system control circuit 137 controls the composition circuit 131 to again select and output the attached audio data.

In this embodiment, as described above, when the after-recording start instruction is given, the TS packet containing the immediately preceding PTS is designated according to the instruction timing, and the timing of outputting after-recording audio data is determined on the basis of the timing of reproduction of the packet. Thus, in the above-described simple system, the after-recording sound can be reproduced by being accurately synchronized with the attached sound originally recorded.

In this embodiment, an audio signal of a data rate different from that of the audio signal originally attached can be added as after-recording sound and the after-recording sound can be reproduced by being accurately synchronized with the attached sound originally recorded.

While this embodiment has been described with respect to a case where attached audio data is encoded by the encoding method of MPEG 2 and multiplexed together with motion image data, the attached audio data may alternatively be encoded by a different encoding method, e.g., the AAC method used for encoding after-recording audio data, and multiplexed in accordance with the format of Private Stream 1 or Private Stream 2 in MPEG 2. Also, after-recording audio data may be multiplexed in accordance with the format of Private Stream 2.

In this embodiment, packet numbers are recorded by being respectively added to TS packets in recording, and the packet number of the TS packet containing the PTS at a time immediately before after-recording is started is recorded together with after-recording audio data during after-recording. However, if the link destination TS packet of the after-recording sound among the audio data originally recorded can be uniquely identified during reproduction, it is not necessary to record the packet number.

Thus, data for identification of the after-recording sound link destination TS packet including the packet number data is recorded in the link destination TS packet and after-recording audio data, and the timing of outputting the after-recording audio data can be controlled on the basis of the identification data during reproduction.

The present invention may be applied to a system constituted by a plurality of devices (e.g., a host computer, an interface device, a reader, a printer, etc.) or an apparatus formed of one device.

The present invention is also constituted by an embodiment in which a computer (CPU or MPU) in an apparatus or system connected to various devices to operate those devices so as to realize the functions of the above-described embodiment is supplied with a program code of software for realizing the functions of the embodiment described above, and is made to operate on the basis of a program stored therein to operate the various devices.

That is, the ordinary operation of recording and reproducing the MPEG2-TS and the processing for recording and reproducing after-recording audio data can be realized by software processing using a microcomputer.

In this case, the program code of the software itself realizes the functions of the above-described embodiment, and the program code itself and a means for supplying the program code to the computer, e.g., a storage medium for storing the program code also constitute the present invention. The storage medium used to store the above-described program code may be, for example, a floppy disk, a hard disk, an optical disc, a magneto-optical disc, a CD-ROM, a magnetic tape, a nonvolatile memory card, or a ROM.

The above-described program code constructs the present invention not only when the program code is executed by the computer to realize the functions of the embodiment but also when the program code realizes the functions of the embodiment in cooperation with an operating system (OS), an application software or the like running on the computer.

Further, the present invention is also constructed in a case where the supplied program code is stored in a memory provided in a function expansion board inserted into the computer or a function expansion unit connected to the computer, and a CPU or the like provided on the function expansion board or the function expansion unit performs a part or the entirety of actual processing in accordance with instructions based on the program code, whereby the functions of the above-described embodiment are realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
  recording means for recording second audio data to be reproduced together with image data instead of first audio data, on a recording medium on which the image data and the first audio data have been already recorded, the first audio data including a plurality of first audio packets, the first audio data including time stamp information indicating an output timing of the first audio data in a reproduction system, the time stamp information being multiplexed in the first audio data at a predetermined interval;
  designating means for arbitrarily designating an after-recording audio reproduction portion of the first audio data to reproduce the second audio data instead of the first audio packets;
  position information generation means for generating position information indicating a position of the first audio packet of the after-recording audio reproduction portion in the first audio data, in response to the designation by said designation means, the position information including information indicating a position of the first audio packet having the time stamp information immediately before the designation by said designation means, and time information indicating a difference between a timing of reproduction of the first audio packet having the time stamp information immediately before the designation by said designation means and the timing of the designation by said designation means; and
  control means for controlling said recording means such that said recording means records the position information on the recording medium together with the second audio data.

2. An apparatus according to claim 1, wherein the second audio data is constituted by a plurality of second audio packets, and said control means controls said recording means such that said recording means records the position information including the time information only in the top packet of the second audio packets in the second audio data.

3. An apparatus according to claim 1, wherein the recording medium is a disk-like recording medium and said recording means records the second audio data in a second recording area defined on the disk-like recording medium separately from a recording area for the first audio data in a diametral direction of the recording medium.

4. An apparatus according to claim 1, wherein the second audio data has a different data rate from the first audio data.

5. An apparatus according to claim 1, wherein the second audio data includes a plurality of second audio packets, and the first audio packets and the second audio packets respectively have packet number data indicating positions of each of the first audio packets in the first audio data and positions of each of the second audio packets in the second audio data.

6. An apparatus according to claim 1, wherein the image data includes a plurality of image packets, and wherein the image data and the first audio data are multiplexed on a unit basis of the image packets and the first audio packets and then recorded on the recording medium.

7. An apparatus according to claim 1, wherein the plurality of first audio packets respectively have packet number data indicating packet numbers in the first audio data, and the position information indicates the packet number of the first audio packet of the after-recording audio reproduction portion.

8. A reproducing apparatus comprising:

reproducing means for reproducing image data, first audio data to be reproduced together with the image data and including a plurality of first audio data packets, second audio data to be reproduced instead of the first audio data together with the image data, and position information indicating a position of the first audio packet of an after-recording audio reproduction portion for reproducing the second audio data instead of the first audio data, from a recording medium, wherein time stamp information indicating an output timing of the first audio data is multiplexed in the first audio data at a predetermined interval, the position information including (a) packet information indicating the first audio packet having the time stamp information immediately before the after-recording audio reproduction portion and (b) time information indicating a difference between a timing of reproduction of the first audio packet having the time stamp information immediately before the after-recording audio reproduction portion, and the after-recording audio reproduction portion;

outputting means for selecting one of the first audio data and the second audio data, reproduced by said reproducing means, and outputting the selected audio data together with the reproduced image data;

mode selection means for selecting one of a normal audio reproduction mode and an after-recording audio reproduction mode; and control means for controlling said outputting means according to the mode selected by said mode selection means, wherein said control means controls said outputting means so as to select the first audio data when the normal audio reproduction mode is selected, and said control means further controls said outputting means so that when the after-recording audio reproduction mode is selected, said outputting means, on the basis of the reproduced position information, selects the first audio data at a portion other than the after-recording audio reproduction portion and selects the second audio data at the after-recording audio reproduction portion, said control means controlling the timing of outputting the second audio data on the basis of the result of detection of the packet information and the time information in the after-recording audio reproduction mode.

9. An apparatus according to claim 8, wherein the second audio data is constituted by a plurality of second audio packets and the position information is recorded only in the top packet of the second audio packets in the second audio data.

10. An apparatus according to claim 8, wherein the plurality of first audio packets respectively have packet number data indicating packet numbers in the first audio data, and the position information indicates the packet number of the first audio packet.

11. An apparatus according to claim 8, wherein the recording medium is a disk-like recording medium and the second audio data is recorded in a second recording area defined on the disk-like recording medium separately from a recording area for the first audio data in a diametral direction of the recording medium.

12. An apparatus according to claim 8, wherein the second audio data has a different data rate from the first audio data.

13. An apparatus according to claim 8, wherein the second audio data includes a plurality of second audio packets, and the first audio packets and the second audio packets respectively have packet number data indicating positions of each of the first audio packets in the first audio data and positions of each of the second audio packets in the second audio data.

* * * * *